3,556,848
HERMETICALLY SEALED ENCLOSURE
FOR BATTERY CELLS
Paul Ruetschi, Yverdon, Switzerland, assignor to
Leclanche S.A., Yverdon, Switzerland
Filed Sept. 13, 1968, Ser. No. 759,724
Claims priority, application Switzerland, Oct. 4, 1967,
13,832/67
Int. Cl. H01m 35/00
U.S. Cl. 136—6                                7 Claims

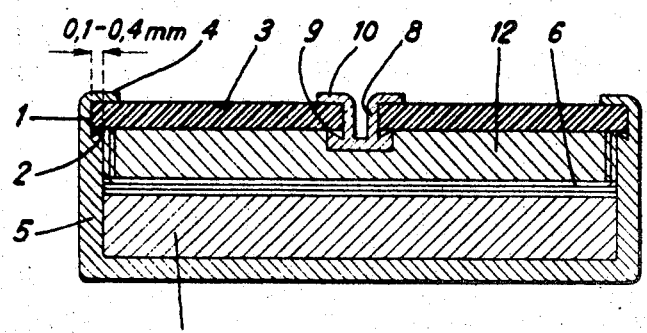
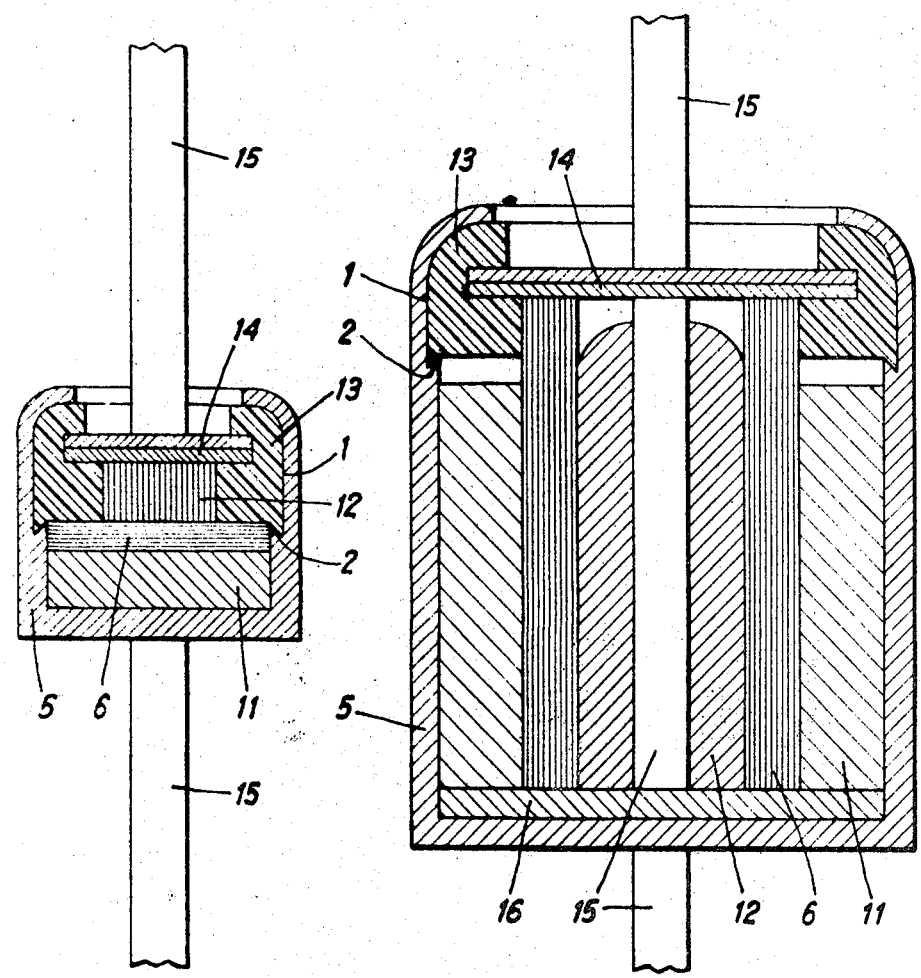

ABSTRACT OF THE DISCLOSURE

The enclosure includes a synthetic-plastic ring member, supported by an internal shoulder machined into the cell can. The shoulder embodies a sharp edge that engages into the plastic ring member.

BACKGROUND OF THE INVENTION

The invention pertains to a hermetically sealed enclosure, for primary and secondary battery cells.

The tiniest alkaline cells are commonly called button cells. The enclosure of these cells consists essentially of two metal cans, open ends opposed, the two cans being electrically insulated from each other by a ring-shaped gasket that also forms the hermetic seal. When the enclosure is sealed shut, the rim of the larger, or outer, case is crimped inwards so as to squeeze the gasket between the outer can and the inner can. During this operation, the resulting axial force within the can must be supported. To this end, three basic schemes are presently being used.

In one, the chemically active components that are housed in the larger can (usually the active components of the positive electrode) are surrounded by a metal ring, the outer diameter of which is equal to the inner diameter of the larger can, into which it exactly fits. The gasket is seated in the metal ring, which supports the axial force when the cell is sealed shut.

In another method, the two cans are completely telescoped into each other. Two sealing rings provide electrical insulation. The first ring insulates the rim of the inner can from the the bottom of the outer can, and the second constitutes the sealing closure between the rim of the outer can and the external wall surface of the inner can.

Thirdly, the axial force can be supported by forming a shoulder in the outer can. The diameter of the lower part of the can, in which the chemically active components are compressed, is smaller than the upper part of the can. The sealing ring, or gasket, which in the simplest form has a cross section in the shape of an L, of a U on its side, is placed onto the shoulder, which bears the axial force during sealing of the battery enclosure. This approach saves space, because it avoids having a large part of the enclosure double-walled, since the two cans overlap only above the sealing ring. The disadvantage, however, is that the cell is no longer a single cylinder, inasmuch as the lower part of the cell has a smaller diameter. But the space required by the cell is often determnied by its maximum diameter and height, so that these cells sometimes do not permit the most efficient use of space, which is particularly disadvantageous with miniaturized electric circuits.

SUMMARY OF THE INVENTION

The purpose of the invention is a battery-cell enclosure that avoids this drawback.

An object of the invention is a battery-cell enclosure that incorporates at least one internal shoulder machined into the cell can, so as to make an upwardly inclined shoulder with a sharp edge, pointing upwards, the metal edge forming an acute angle, a synthetic plastic ring member supported by the shoulder and embodying an opening, and a metal member for sealing shut the opening.

This object and others of the invention will be apparent from the ensuing detailed description.

BRIEF DESCRIPTION OF THE DRAWING

The invention will be described, with reference to the figures of the accompanying drawings, wherein:

FIG. 1 is a view in cross section of a first embodiment of the housing for a button cell, FIG. 2 is a view in cross section of a second embodiment, and FIG. 3 is a cross sectional view of a third embodiment.

DESCRIPTION OF THE PREFERRED EMBODIMENTS

With reference to the figures of the drawing, the wall thickness of the upper end 1 of the metal can 5 is reduced by machining, so as to make an upwardly inclined shoulder with a sharp edge 2, pointing upwards, the metal edge forming an acute angle. The reduction in the thickness of the wall is between 0.1 and 0.4 mm. When the end of the cell is closed by a sealing ring 3 (FIG. 1) made of a suitable synthetic plastic that is not attacked by the electrolyte of the cell, such as nylon, polyethylene, or that known under the registered trade mark Teflon, the sharp edge 2 engages into the ring, assuring a hermetic seal.

With the ring 3 in place, the can edge 4 is crimped over in a known manner, so that the ring is permanently pressed against the edge 2. The result is an extremely good seal, even with smallest cells.

In the embodiment shown in FIG. 1, a lead-through metal contact 8, in the form of a rivet, is mounted in the ring 3. The contact incorporates an upwardly inclined shoulder with a sharp edge 9 points upwards, the metal edge forming an acute angle. This edge is forced to penetrate into the ring 3. The edge 10 of the contact is bent outwards so as to rivet the latter to the ring. The lead-through contact 8 serves as the contact for the negative elecrode 12, and the case 5 the contact for the positive electrode 11.

These arrangements are particularly suitable for very small nickel-cadmium, mercuric oxide-cadmium, and mercuric oxide-zinc cells. In the latter two systems the positive electrode 11, held in the can 5, is preferably composed of a mixture of about 85% mercuric oxide, 5% graphite and 10% manganese dioxide.

The negative electrode 12 is composed of finely divided metallic cadmium, or finely divided zinc amalgam. The separator 6 consists of microporous felt and membranes that are permeable to the electrolyte.

The can 5 can be made of stainless steel, nickel, kovar or similar alloys.

If one deals with the mercuric oxide-zinc system, the part of the enclosure which contacts the negative, zinc, electrode 12, must at least on its inner side be composed of amalgamated copper or silver, or alloys of the metals, in order to avoid the evolution of hydrogen.

The corresponding parts of the three embodiments, illustrated in FIGS. 1, 2 and 3, respectively, are given the same reference number in the drawing. With reference to FIGS. 2 and 3, the battery-cell enclosure includes a synthetic-plastic sealing ring 13, in which a metal top 14 is sealingly squeezed. For cells with negatives electrodes of zinc, the cap comprises two layers, an outer layer composed of a nickel or iron alloy and an inner composed of a copper or silver alloy. Because of the cells' extremely small size, the leads 15 of the cells shown in FIGS. 2 and 3 are welded on.

The positive electrode 11 of the embodiment shown in

FIG. 2 consists of mercuric oxide or silver oxide, or of sintered or pressed nickel and nickel hydroxide.

The negative electrode 12 comprises zinc powder or spongy cadmium.

The leads 15 are attached by resistance welding, the welding time being about one millisecond.

The embodiment illustrated in FIG. 3 shows a concentric-cylindrical electrode arrangement. The plate 16 resting on the bottom of the case 5 electrically insulates the negative electrode 12 from the case, which latter serves as the positive pole. The plate 16 is made of a suitable insulator, such as nylon, polyethylene, polypropylene, or that known under the registered trademark Teflon.

The embodiments shown in FIGS. 2 and 3 are particularly suitable for the very tiniest cells, such as those having a diameter of two millimeters or smaller, the embodiment shown in FIG. 2 being used for short, and that in FIG. 3 for long, cylindrical cells. With cells having extremely small diameters, it is difficult or impossible to use the construction, shown in FIG. 1, since a sufficiently small rivet cannot be made. For very small cells, the leads are welded to the positive and negative poles of the cells illustrated in FIGS. 2 and 3. Consequently, these cells have the same appearance as other miniature electronic components, e.g. resistors and capacitors, and can therefore be mounted in circuits in the same way as these other components.

The miniature cells described are completely leakproof and gas tight.

Although the preferred embodiments have been described, the breadth of protection afforded to the invention is limited solely by the appended claims.

What is claimed is:

1. In combination with an alkaline primary or secondary miniature cell a hermetically sealed enclosure, the enclosure including a cylindrical metal can with no exterior shoulder and holding the positive electrode, and wherein the improvement comprises a synthetic-plastic ring member embodying an opening, at least one sharp edge machined into the cylindrical inside wall surface of said metal can, said edge forming an acute angle pointing upwards and being 0.1–0.4 mm. deep, the wall of said metal can being diminished in thickness by the same amount above the edge, the rim of said can being crimped inward in engagement with said ring member to provide a sealed enclosure, the sharp edge of said can supporting and engaging into said synthetic-plastic member, and a metal member in engagement with said opening of said ring member for sealing shut the opening.

2. The hermetically sealed enclosure as defined in claim 1, wherein said metal member is a cap.

3. The hermetically sealed enclosure as defined in claim 1, wherein said metal member is a rivet, said rivet including a base head including the sharp edge, pointing upwards, which is forced into the surface of said synthetic-plastic ring member during the riveting operation.

4. The hermetically sealed enclosure as defined in claim 1, in which the tip of the edge is at least 0.1 mm. higher than the base of the edge.

5. The hermetically sealed enclosure as defined in claim 1, wherein said metal member is in electrical contact with the negative electrodes of the cell to enable an external connection to be made to this electrode.

6. The hermetically sealed enclosure as defined in claim 1, wherein said synthetic plastic ring member consists of nylon.

7. The hermetically sealed enclosure of claim 1, wherein said metal member consists of a laminated structure, the inside of said laminate consisting of copper, silver or its alloys, and the outside consisting of nickel or a non-oxidizing nickel alloy, the cell containing a negative electrode of amalgamated zinc.

References Cited

UNITED STATES PATENTS

| | | | |
|---|---|---|---|
| 2,607,809 | 8/1952 | Pitzer | 136—107 |
| 2,636,062 | 4/1953 | Colton | 136—133 |
| 2,693,499 | 11/1954 | Neumann | 136—133 |
| 1,874,404 | 8/1932 | Wood | 136—6 |
| 2,706,214 | 4/1955 | Arbogast | 136—133 |
| 3,023,258 | 2/1962 | Peters | 136—6 |
| 3,173,808 | 3/1965 | Himy et al. | 136—133 |
| 3,320,094 | 5/1967 | Yamamoto et al. | 136—133 |
| 3,427,205 | 2/1969 | Plitt et al. | 136—133 |
| 3,442,716 | 5/1969 | Muraki et al. | 136—133 |

ALLEN B. CURTIS, Primary Examiner

C. F. LeFEVOUR, Assistant Examiner

U.S. Cl. X.R.

136—83, 133